(12) United States Patent
Arbesman et al.

(10) Patent No.: US 10,316,911 B2
(45) Date of Patent: *Jun. 11, 2019

(54) COMPOSITE DISC BRAKE BACKING PLATE

(71) Applicant: Gripmetal Limited, Dublin (IE)

(72) Inventors: Ray Arbesman, Toronto (CA); Nghi Pham, Concord (CA); Winston MacKelvie, Knowlton (CA)

(73) Assignee: Gripmetal Limited, Dublin (IE)

( * ) Notice: Subject to any disclaimer, the term of this patent is extended or adjusted under 35 U.S.C. 154(b) by 56 days.

This patent is subject to a terminal disclaimer.

(21) Appl. No.: 15/585,134

(22) Filed: May 2, 2017

(65) Prior Publication Data

US 2017/0234385 A1    Aug. 17, 2017

Related U.S. Application Data

(63) Continuation of application No. 15/041,798, filed on Feb. 11, 2016, now Pat. No. 9,670,976, which is a continuation of application No. 14/534,005, filed on Nov. 5, 2014, now Pat. No. 9,291,225, which is a continuation of application No. PCT/IB2013/002968, filed on Nov. 22, 2013.

(51) Int. Cl.
*F16D 69/04* (2006.01)
*F16D 65/092* (2006.01)
*F16D 65/095* (2006.01)

(52) U.S. Cl.
CPC ......... *F16D 65/095* (2013.01); *F16D 65/092* (2013.01); *F16D 69/0408* (2013.01); *F16D 2069/0441* (2013.01); *F16D 2069/0491* (2013.01)

(58) Field of Classification Search
CPC ..... F16D 2069/0441; F16D 2069/0483; F16D 2069/0491; F16D 65/092; F16D 65/22; F16D 69/027; F16D 69/095; F16D 65/095; F16D 69/0408
USPC ...................... 188/251 A, 258, 250 B, 250 G
See application file for complete search history.

(56) References Cited

U.S. PATENT DOCUMENTS

| 1,897,088 A | 2/1933 | Victor et al. |
| 1,915,221 A | 6/1933 | Fitzgerald |

(Continued)

FOREIGN PATENT DOCUMENTS

| CA | 1118179 | 2/1982 |
| CA | 1330521 | 7/1994 |

(Continued)

OTHER PUBLICATIONS

"Graphite Sheet Gaskets", Environmental Gasket Company LTD., copyright 2009, 2009, 5 pages.

(Continued)

*Primary Examiner* — Pamela Rodriguez
(74) *Attorney, Agent, or Firm* — Brooks Kushman P.C.

(57) ABSTRACT

A brake backing plate is provided in which a non-compressible core material is sandwiched between two sheet metal stampings to make a lightweight, composite brake backing plate. Each of the stampings has a textured face with a plurality of integrally formed piercing members. By rolling or pressing, the piercing members of the textured faces are fully embedded in the core material, and thus lock the stampings and the core material together.

20 Claims, 8 Drawing Sheets

(56) References Cited

U.S. PATENT DOCUMENTS

| | | |
|---|---|---|
| 2,171,530 A | 9/1939 | Balfe |
| 2,255,268 A | 9/1941 | Perrine |
| 2,274,765 A | 3/1942 | Zalkind |
| 3,092,532 A | 6/1963 | Swick et al. |
| 3,170,354 A | 2/1965 | Scholl et al. |
| 3,533,891 A | 10/1970 | Wallace et al. |
| 3,551,232 A | 12/1970 | Thompson et al. |
| 3,557,407 A | 1/1971 | Lemelson |
| 3,605,360 A | 9/1971 | Lindal |
| 3,615,994 A | 10/1971 | Maclaine et al. |
| 4,023,613 A | 5/1977 | Uebayasi et al. |
| 4,234,638 A | 11/1980 | Yamazoe et al. |
| 4,552,252 A | 11/1985 | Stahl et al. |
| 4,569,424 A | 2/1986 | Taylor, Jr. |
| 4,640,390 A | 2/1987 | Saumweber et al. |
| 4,705,278 A | 11/1987 | Locacius et al. |
| 4,723,783 A | 2/1988 | Belter et al. |
| 4,776,602 A | 10/1988 | Gallo et al. |
| 4,781,389 A | 11/1988 | Beyer et al. |
| 4,815,172 A | 3/1989 | Ward et al. |
| 4,911,972 A | 3/1990 | Mercuri |
| 4,939,818 A | 7/1990 | Hahn et al. |
| 5,067,210 A | 11/1991 | Keyaki |
| 5,142,743 A | 9/1992 | Hahn et al. |
| 5,143,184 A | 9/1992 | Snyder et al. |
| 5,172,920 A | 12/1992 | Schlenk |
| 5,362,074 A | 11/1994 | Gallo et al. |
| 5,376,410 A | 12/1994 | MacKelvie et al. |
| 5,469,604 A | 11/1995 | Calmettes et al. |
| D374,609 S | 10/1996 | Akeno |
| D376,533 S | 12/1996 | Akeno |
| 5,611,122 A | 3/1997 | Torigoe et al. |
| 5,788,247 A | 8/1998 | Tensor |
| D400,427 S | 11/1998 | Okawa et al. |
| 5,842,546 A | 12/1998 | Biswas et al. |
| 5,896,629 A | 4/1999 | Van Hooreweder |
| D425,405 S | 5/2000 | Naohara et al. |
| 6,247,704 B1 | 6/2001 | Battistoni et al. |
| 6,258,457 B1 | 7/2001 | Ottinger et al. |
| 6,276,045 B1 | 8/2001 | Buchi et al. |
| 6,279,222 B1 | 8/2001 | Denton et al. |
| 6,383,678 B1 | 5/2002 | Kaneko et al. |
| 6,431,331 B1 | 8/2002 | Arbesman et al. |
| 6,464,047 B1 | 10/2002 | Arbesman |
| 6,622,346 B2 | 9/2003 | Graham et al. |
| 6,671,935 B2 | 1/2004 | Filion et al. |
| 6,843,095 B2 | 1/2005 | Arbesman |
| 6,860,368 B2 | 3/2005 | Kulis, Jr. et al. |
| 6,910,255 B2 | 6/2005 | Arbesman |
| 6,913,673 B2 | 7/2005 | Baggot et al. |
| 7,048,097 B2 | 5/2006 | Arbesman |
| 7,175,007 B2 | 2/2007 | Roberts et al. |
| 7,222,701 B2 | 5/2007 | Pham et al. |
| 7,320,386 B2 | 1/2008 | Kulis, Jr. et al. |
| 7,686,142 B2 | 3/2010 | Jung |
| 7,841,052 B2 | 11/2010 | Ducauchuis |
| 7,989,049 B2 | 8/2011 | Potier |
| 8,048,507 B2 | 11/2011 | Townsend et al. |
| 8,088,316 B2 | 1/2012 | Muth et al. |
| D654,355 S | 2/2012 | Cheng |
| 8,407,864 B2 | 4/2013 | Mask et al. |
| 8,683,840 B2 | 4/2014 | Tuma et al. |
| 8,685,520 B2 | 4/2014 | Meyer et al. |
| 9,259,899 B1 | 2/2016 | Arbesman |
| 9,273,741 B1 | 3/2016 | Arbesman et al. |
| 9,291,225 B2 | 3/2016 | Arbesman et al. |
| 9,360,067 B1 | 6/2016 | Arbesman et al. |
| 9,388,872 B1 | 7/2016 | Arbesman et al. |
| 9,670,976 B2 * | 6/2017 | Arbesman ............ F16D 65/092 |
| 2002/0169435 A1 | 11/2002 | Neeb et al. |
| 2002/0170789 A1 | 11/2002 | Poelemans et al. |
| 2004/0016608 A1 | 1/2004 | Gutowski |
| 2004/0140165 A1 | 7/2004 | Pham et al. |
| 2005/0170157 A1 | 8/2005 | Armela et al. |
| 2006/0027427 A1 | 2/2006 | Anda et al. |
| 2006/0118238 A1 | 6/2006 | Borazghi |
| 2006/0243017 A1 | 11/2006 | Jung et al. |
| 2006/0246256 A1 | 11/2006 | Ausen et al. |
| 2008/0003401 A1 | 1/2008 | Barnes et al. |
| 2009/0223753 A1 | 9/2009 | Kappagantu et al. |
| 2010/0170758 A1 | 7/2010 | Chen et al. |
| 2010/0207334 A1 | 8/2010 | Virgin et al. |
| 2011/0036736 A1 | 2/2011 | Knowlton et al. |
| 2011/0051724 A1 | 3/2011 | Scott et al. |
| 2011/0079065 A1 | 4/2011 | Cabanski et al. |
| 2011/0233875 A1 | 9/2011 | Shaver et al. |
| 2011/0260371 A1 | 10/2011 | Arora et al. |
| 2012/0003462 A1 | 1/2012 | Wong et al. |
| 2012/0006959 A1 | 1/2012 | Braun et al. |
| 2013/0152654 A1 | 6/2013 | Arbesman et al. |
| 2015/0024231 A1 | 1/2015 | Kutsumizu et al. |
| 2015/0053517 A1 | 2/2015 | Arbesman et al. |
| 2015/0086750 A1 | 3/2015 | Arbesman et al. |
| 2015/0099093 A1 | 4/2015 | Arbesman et al. |
| 2015/0140255 A1 | 5/2015 | Mackelvie |
| 2016/0046110 A1 | 2/2016 | Broering et al. |
| 2016/0091041 A1 | 3/2016 | Arbesman |
| 2016/0160944 A1 | 6/2016 | Arbesman et al. |
| 2016/0176152 A1 | 6/2016 | Mackelvie |
| 2016/0230792 A1 | 8/2016 | Arbesman et al. |

FOREIGN PATENT DOCUMENTS

| | | |
|---|---|---|
| CA | 1337622 | 11/1995 |
| CA | 2127339 | 1/1996 |
| CA | 2272115 | 11/1999 |
| CA | 2300401 | 12/1999 |
| CA | 2391183 | 12/2003 |
| CA | 2760923 | 6/2013 |
| CA | 2778455 | 11/2013 |
| CA | 145893 | 12/2013 |
| CA | 2780397 | 12/2013 |
| CA | 2798303 | 6/2014 |
| CA | 2821897 | 1/2015 |
| CN | 1599846 | 3/2005 |
| CN | 1286625 | 11/2006 |
| CN | 102272471 | 12/2011 |
| CN | 203404286 | 1/2014 |
| DE | 19754740 | 3/1999 |
| DE | 102004048464 | 4/2006 |
| DE | 102006015100 | 10/2007 |
| DE | 102006015145 | 10/2007 |
| DE | 102006015148 | 10/2007 |
| EP | 859163 | 8/1998 |
| EP | 934820 | 8/1999 |
| GB | 2125126 | 2/1984 |
| GB | 2359186 | 8/2001 |
| GB | 2507128 | 4/2014 |
| JP | 59174431 | 11/1984 |
| JP | 04003136 | 1/1992 |
| JP | 06094057 | 4/1994 |
| JP | 8021462 | 1/1996 |
| JP | 2013012626 | 1/2013 |
| JP | 2013053687 | 3/2013 |
| JP | 2013089799 | 5/2013 |
| WO | 02090792 | 11/2002 |
| WO | 2011051724 | 5/2011 |
| WO | 2013177667 | 12/2013 |
| WO | 2015010183 | 1/2015 |

OTHER PUBLICATIONS

"Graphite Sheet with Tanged Metal data sheet", Cixi CAZseal Packing & Gasket Co, Ltd., 1 page.
"SL T-20 Tang Sheet Specifications Datasheet," Dynoteq Kft, 1 page.
"Specification Sheet: SPG7003", SPG Gaskets Co., 1 page.
"Supagraf Expanded Graphite Jointings data sheet", James Walker & Co., 1 page.
"Tanged Graphite Datasheet", Alba Gaskets—Tanged Graphite data I specification sheet, 1 page.
"Tanged Metal Reinforced Graphite Gasket data sheet", Ningbo Sunwell Fluid Technologies Co., Ltd., 2010, 1 page.

(56) References Cited

OTHER PUBLICATIONS

"Tanged Stainless Steel Reinforced Graphite Sheet data sheet", Gee Graphite, 1 page.
U.S. Appl. No. 15/041,798, "Non-Final Office Action", dated Sep. 14, 2016, 8 pages.
U.S. Appl. No. 15/041,798, "Notice of Allowance", dated Feb. 6, 2017, 5 pages.
Harte et al., "Fatigue Failure of an Open Cell and a Closed Cell Aluminum Alloy Foam", Acta mater. vol. 47, No. 8, 1999, pp. 2511-2524.
PCT/IB2013/002968, "International Search Report", dated Apr. 17, 2014, 5 pages.
Wang et al., "The Static Compressive Behavior of Aluminum Foam", Rev. Adv. Mater. Sci. 33, 2013, pp. 316-321.

\* cited by examiner

COMPOSITE DISC BRAKE BACKING PLATE

CROSS-REFERENCE TO RELATED APPLICATIONS

This application is a U.S. continuation application of Ser. No. 15/041,798, filed Feb. 11, 2016, now U.S. Pat. No. 9,670,976, issued Jun. 6, 2017, which is a U.S. continuation application of Ser. No. 14/534,005, filed Nov. 5, 2014, now U.S. Pat. No. 9,291,225, issued Mar. 22, 2016, which is a U.S. continuation application under 35 U.S.C. § 111(a) claiming priority under 35 U.S.C. §§ 120 and 365(c) to International Application No. PCT/IB2013/002968, filed Nov. 22, 2013, which claims the priority benefit of Canadian Patent Application No. 2,798,303, filed Dec. 7, 2012, the contents of which are incorporated by reference herein in their entirety for all intended purposes.

FIELD OF THE INVENTION

The invention relates to backing plates for disc brake pads.

BACKGROUND OF THE INVENTION

Modern vehicle brake systems allow for slowing or stopping movement of the vehicle in a controlled manner. A typical automobile or light truck brake system includes a disc brake assembly for each of the front wheels and either a drum brake assembly or a disc brake assembly for each of the rear wheels. The brake assemblies are simultaneously actuated by hydraulic or pneumatic pressure generated when an operator of the vehicle depresses a brake pedal. The structures of these drum brake assemblies and disc brake assemblies, and their actuators, are well known in the art.

A typical disc brake assembly includes a rotor which is secured to the wheel of the vehicle for rotation therewith. The rotor has a pair of opposed friction faces which are selectively engaged by portions of a caliper assembly. The caliper assembly is slidably supported by pins secured to an anchor plate. This anchor plate is in turn secured to a non-rotatable component of the vehicle, such as the suspended wheel hub. A pair of brake pads (or shoes) are disposed in the caliper assembly on opposite sides of the rotor. These brake pads are operatively connected to one or more hydraulically actuated pistons for movement between a non-braking position, wherein they are spaced apart from the opposed friction plates of the rotor; and a braking position, wherein they are moved into frictional engagement with the opposed friction plates of the rotor. Depressing the brake pedal causes the piston to urge the brake pads from the non-braking position to the braking position, frictionally engaging the friction faces to the rotor and thereby slowing or stopping the rotation of the associated wheel of the vehicle.

Each brake pad is made up of a relatively thick, substantially planar metallic body (the backing plate) to which is attached a cake of friction material (typically a molded composite material) in various ways (including adhesive, rivets, and integral molding into holes or raised features in/on the backing plate).

Backing plates for brake pads are typically made of a single piece of solid steel. The backing plate distributes the force of the caliper piston across the brake pad, and thus it has been believed that a single piece solid backing plate is necessary to provide sufficient strength and rigidity. However, such pieces are very heavy, particularly in large truck applications. This has been a recognized problem in the art. Weight on the sprung or suspended components of a vehicle degrades ride quality and handling, as well as leading to increased fuel consumption and waste of valuable material. There have been attempts to address the weight issue by making a slightly thinner backing plate that is "thickened" in local areas (typically edge perimeter) by embossing. However, the resulting plates are still quite heavy.

It would be desirable to provide a lighter weight alternative, taking advantage of other materials' beneficial properties, while maintaining strength and rigidity.

SUMMARY OF THE INVENTION

According to a first aspect of the invention, a brake backing plate is provided. To make up the plate, a non-compressible core material is sandwiched between a first sheet metal stamping and a second sheet metal stamping. The first sheet metal stamping and the second sheet metal stamping each have a textured face with a plurality of integrally formed piercing members.

By rolling or pressing, the textured faces of each of the stampings engage the core material and their piercing members are fully embedded in the core material. Thus, the piercing members act to lock together the first sheet metal stamping, the second sheet metal stamping and the core material.

Preferably, at least one of the first sheet metal stamping and the second sheet metal stamping is steel.

Preferably, the core material is a lightweight composite material. In one embodiment, the core material is a friction material.

In certain embodiments, the core material may be a curable material, in which case, the first sheet metal stamping and the second sheet metal stamping can be assembled together while the core material is in an uncured or partially cured state, before allowing the core material to cure or finish curing.

The first sheet metal stamping may include a second textured face with a plurality of integrally formed piercing members for attaching to a friction material to form a brake friction pad.

The first sheet metal stamping may include at least one embossment (e.g. to increase the sheet metal stamping stiffness).

Various shapes of piercing members are possible. In one (presently preferred) embodiment, the piercing members have a hook shape.

At least some of the piercing members may extend through the core material to contact the opposing textured face. These piercing members may be clinched by contact with the opposite textured face. Further, the piercing members may be co-clinched with each other.

In one embodiment, the core material is a fibrous material and the piercing members engage with and catch on fibers of the fibrous material.

Preferably, the core material is selected to be heat-resistant. The core material may also have other benefits—e.g. be weather-resistant, or corrosion-resistant.

Preferably, the first sheet metal stamping and the second sheet metal stamping are solid, non-perforated sheets, and the piercing members are formed on the surface of the first sheet metal stamping and the second sheet metal stamping without piercing or perforating through the stamping.

The first sheet metal stamping and the second sheet metal stamping may be precut to required dimensions for a finished brake backing plate shape prior to assembly with the core material.

Alternatively, at least one of the first sheet metal stamping and the second sheet metal stamping may be precut larger than required dimensions for a finished brake backing plate shape. At least a portion of this excess may be bent to at least partially cover an edge surface of the core material after assembly.

In one such embodiment, the brake backing plate shape has abutment ends, and the excess is provided in the form of at least one tab at each abutment end. This at least one tab is bent to at least partially cover the core material at the abutment end. This at least one bent tab provides a substantially smooth and flat abutment surface for the brake backing plate (e.g. to transfer load and allow sliding movement where it engages the caliper body).

DETAILED DESCRIPTION

Figure 1:
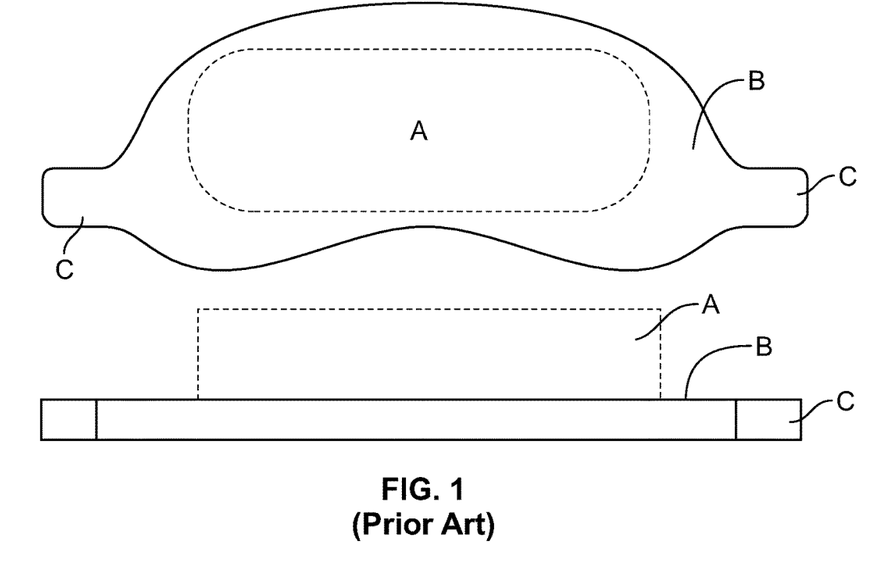
FIG. 1 shows isometric top and front views of a disc brake pad (prior art).

As shown in FIG. 1 (in isometric top and front views), the prior art brake pad is made up of a friction material cake A that is joined to a backing plate B.

The friction material is an ablative material that contacts the rotor in the course of braking. Friction materials are generally composite materials, whose components may include metallic, semi-metallic, inorganic (e.g. ceramic) and organic compounds. In some formulations, friction material may include particles, filaments, shavings or fibers dispersed in the material. A pre-form cake of friction material is molded onto the backing plate using a heat pressure molding system whereby the cake flows into and around various features on the backing plate. When cooled, the friction material becomes fully hard and bonded to the backing plate.

Prior art backing plates are solid, typically steel, plates that may have holes or other features for retaining friction material. There are many different shapes of backing plates, but many applications include abutment ends C, which are used for mounting and alignment in the caliper bracket.

In the present invention, a lightweight alternative backing plate is provided. The weight is saved by using relatively thin metal stampings that are permanently joined in a sandwich with a lightweight core material. The overall laminated structure displays equivalent strength and rigidity to solid steel backing plates, and accordingly, there is no loss of function for the decrease in weight.

The plate is referred to as a "composite" backing plate by virtue of the fact that it is composed of heterogeneous materials with inferior properties on their own, which are enhanced and made superior by virtue of their joining.

Figure 2:
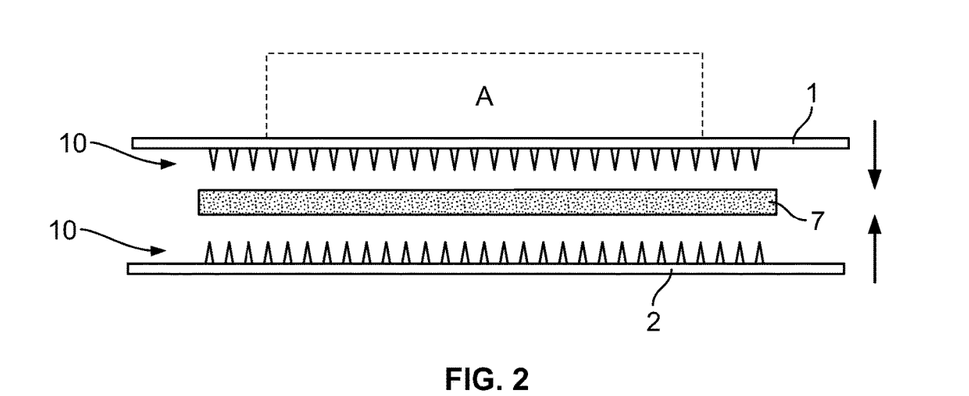
FIGS. 2-4 are side views showing formation of a sandwich between metal stampings 1, 2 and core material 7.
Figure 3:
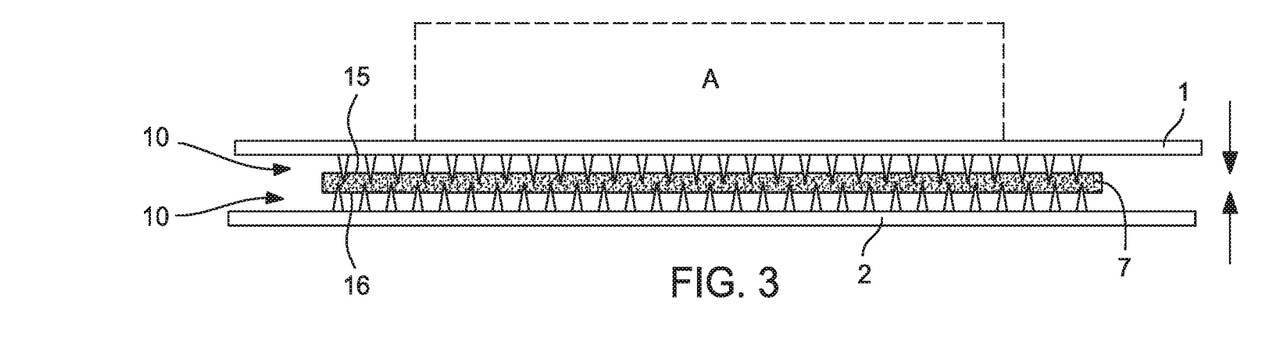
Figure 4:
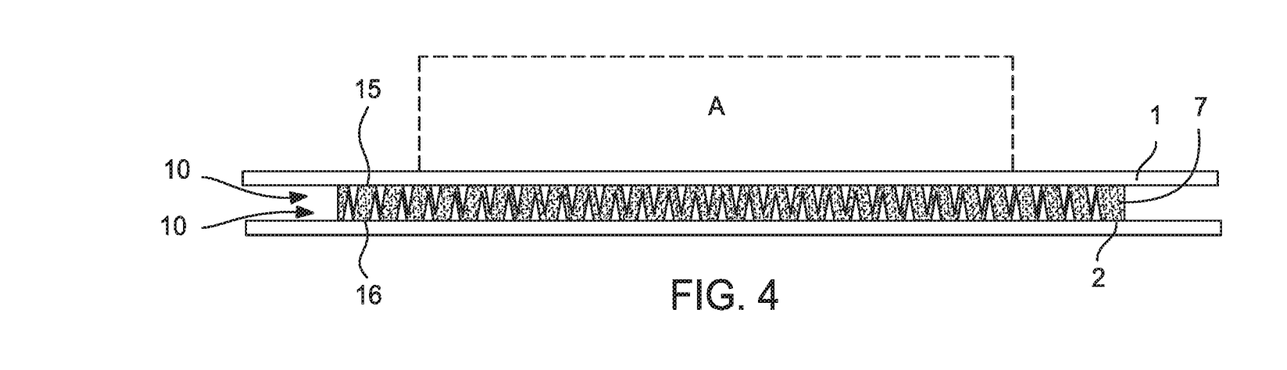
Figure 8:
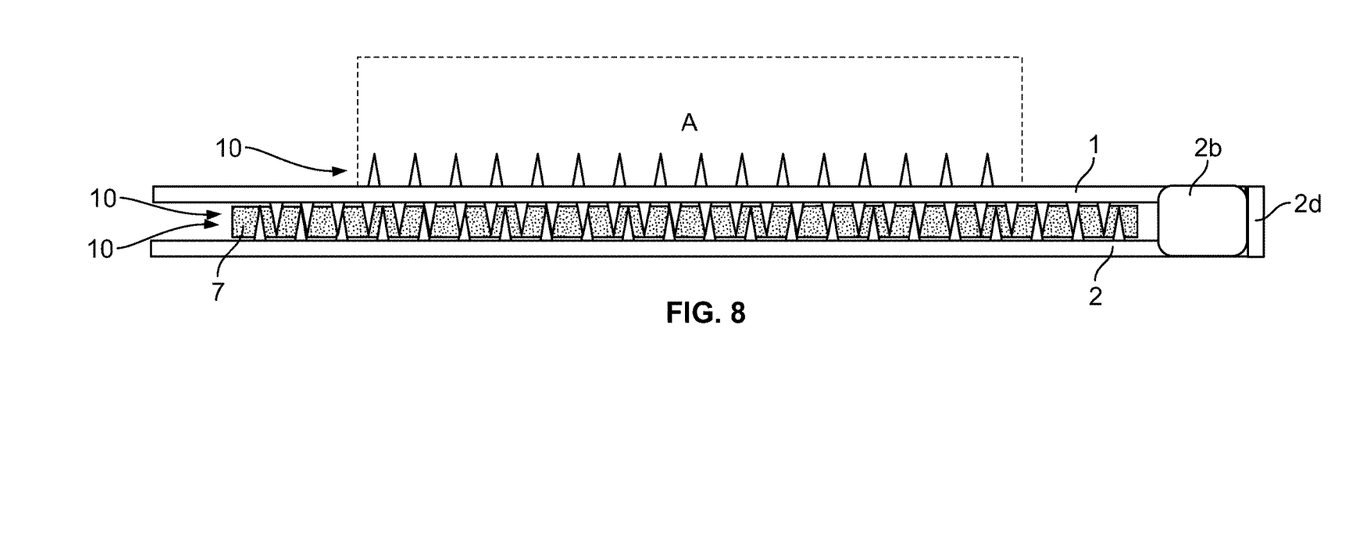
FIG. 8 is a side view of a second embodiment of the sandwich having friction material 20 attached by a second array 10 of piercing members 5.

FIGS. 2-4 illustrate in general outline the process for forming a composite backing plate according to the present invention. A first (upper) sheet metal stamping (generally designated 1) and a second (lower) sheet metal stamping (generally designated 2) are placed so as to sandwich between them a lamina of non-compressible core material 7. Each metal stamping has an inward facing textured surface and an outer surface (which may be plain, as shown in FIGS. 2-4 or may have an exposed texture as shown in FIG. 8, 9). On the stamping 1, the textured (inward) face is 12, and the outward face is 11. On stamping 2, the textured (inward) face is 13, and the outward face is 14. Generally speaking, the orientation of the entire sandwich is reversible.

Figure 6:
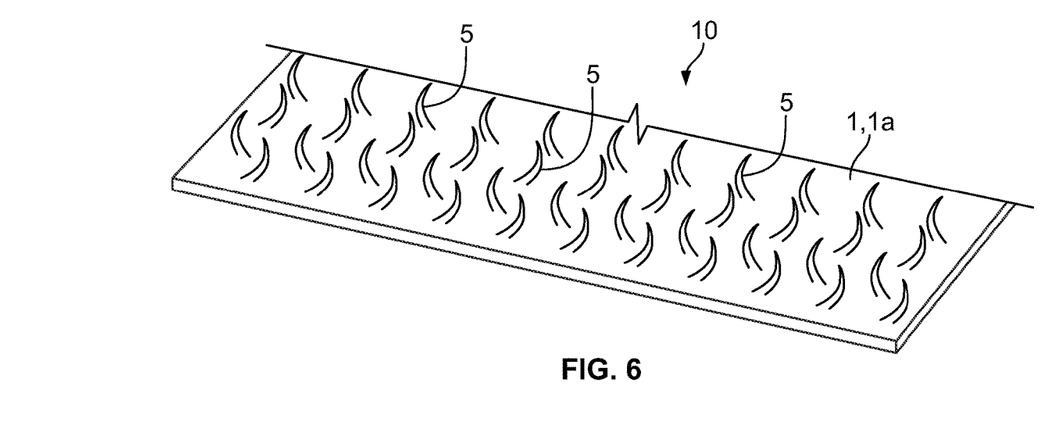
FIG. 6 is a perspective view of a portion of array 10 of piercing members 5.

As shown in FIG. 6, the textured faces 12, 13 feature an array 10 of piercing members 5.

As shown in FIG. 3, as the stampings 1, 2 are brought together, the piercing members 5 bite into and begin to penetrate the core material 7. Finally, as shown in FIG. 4, when the flat portions of the textured surfaces 12, 13 touch down at the surfaces 15, 16 of the non-compressible core material 7, the piercing structures have reached maximum penetration and by embedment are locked to the core material.

As used herein, "piercing member" describes any type of nail- or pin-like structure (or hooked or barbed structure) raised on the surface of a material (for embedding or piercing). The piercing members 5 may be raised from the surface by carving, gouging or scraping an integral projection from the surface of the material itself. One method of forming such piercing members is described in co-pending Canadian Patent Application No. 2,778,455, by the present applicants, filed May 29, 2012, which is entitled "Bulk Textured Material Sheeting." Related processes are also described in Canadian Patent Nos. 1,330,521; 1,337,622; or 2,127,339. The foregoing disclosures are incorporated herein by reference.

Figure 5:
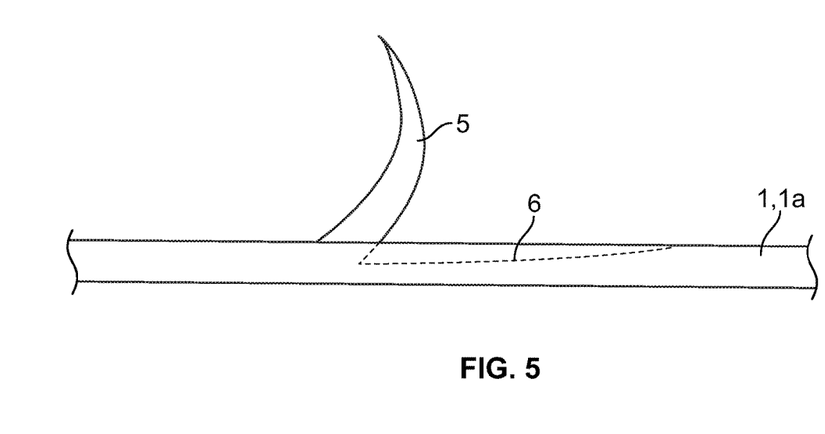
FIG. 5 is a detail view of one piercing member 5.
Figure 14:
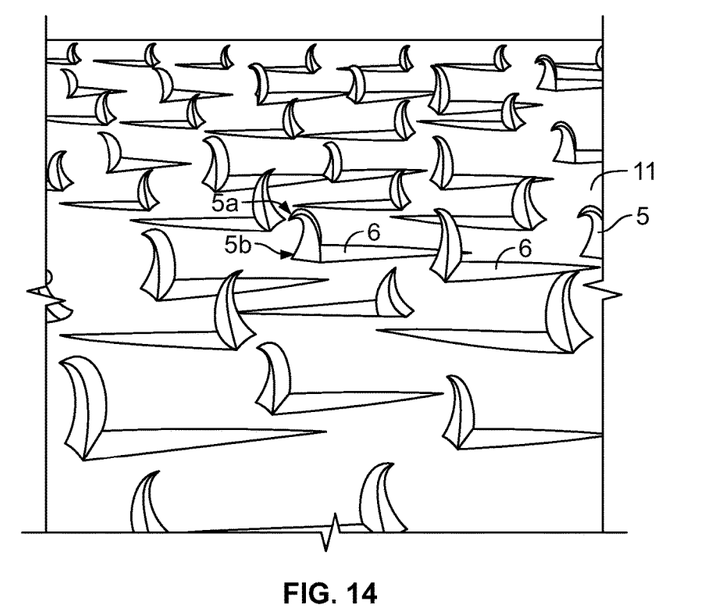
FIG. 14 is a detailed view of surface 11 with detail of one embodiment of piercing member 5.

The gouging or scraping process may result in a piercing member 5 having a configuration as shown in FIGS. 5 and 6, where each piercing member 5 has an adjacent surface trench 6 from which material has been removed. The piercing member may be somewhat hook-shaped as shown in FIG. 5 (and in FIG. 14, in which the hooks are shown having a tip portion 5a opposite root portion 5b), or a more straight upright (e.g. nail-like) member may be provided.

Figure 11:
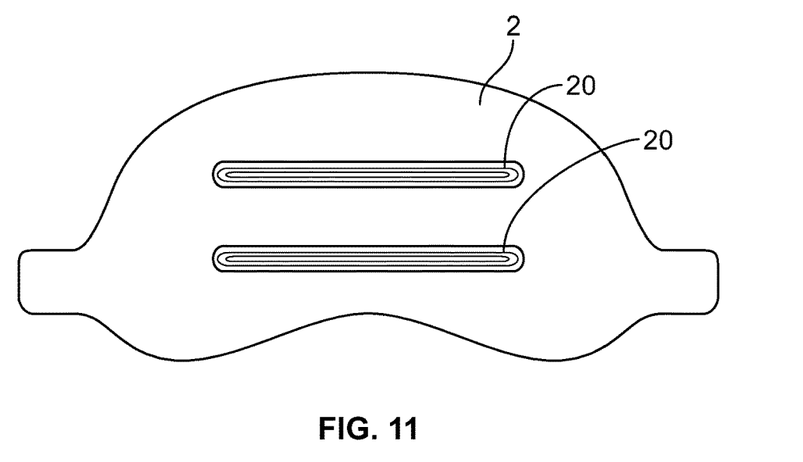
FIG. 11 is a top view of a stamping having embossed areas 20.
Figure 12:
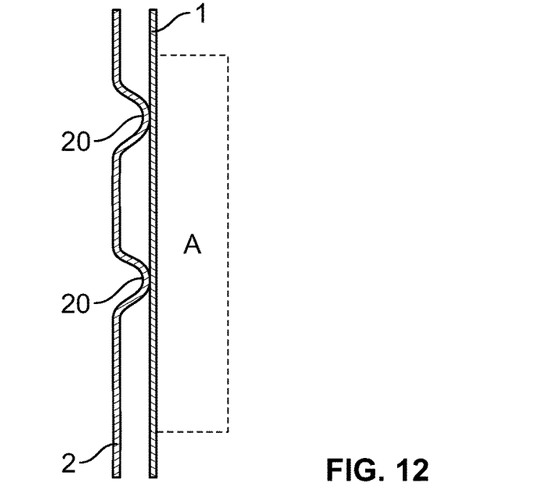
FIG. 12 is a cross-sectional view along lines 12-12 of FIG. 11.
Figure 13:
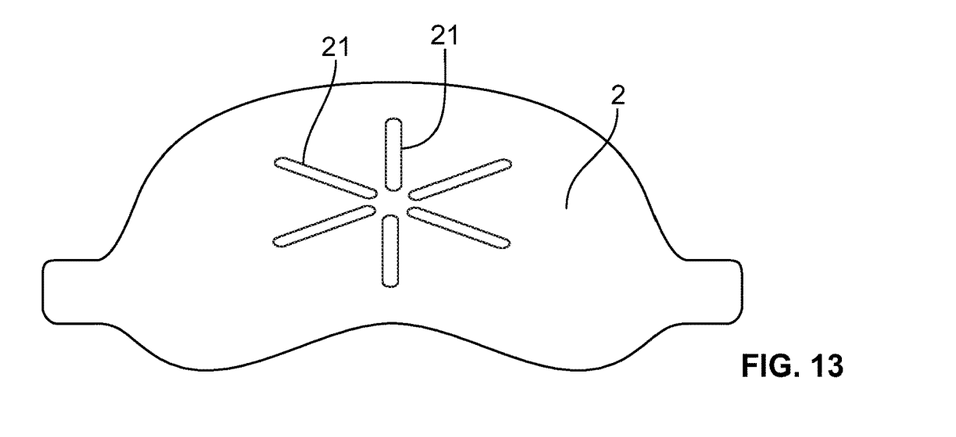
FIG. 13 is a top view of a stamping having a radial pattern of embossed areas 21.

To form each stamping 1, 2, a continuous length of pre-textured material (i.e. having such piercing members already formed) may be stamped into finished composite plate profiles. Alternatively, precut workpieces may be textured individually. The second method may be preferred to obtain a more customized outline of piercing members on the surface. Further, prior to assembly in the sandwich, the stampings may undergo other forming operations, including embossing areas of the stamping (e.g. to provide additional friction material attachment surfaces, and/or to provide additional stiffness of the stamping). At this stage, the properties of the metal stamping are easily controlled. For example, as shown in FIG. 11 (whose cross-sectional view is provided in FIG. 12), embossings 20 may be press-formed on stamping 2. Embossing provides a way for the piston's high force to be distributed across the stamping 2 (not just in the small central patch struck by the piston). In turn, the entire surface of the brake pad A contacts the rotor to provide maximum braking performance. FIG. 13 shows another embodiment with a radial pattern of embossing 21 to spread the piston's force in all directions.

Figure 10:
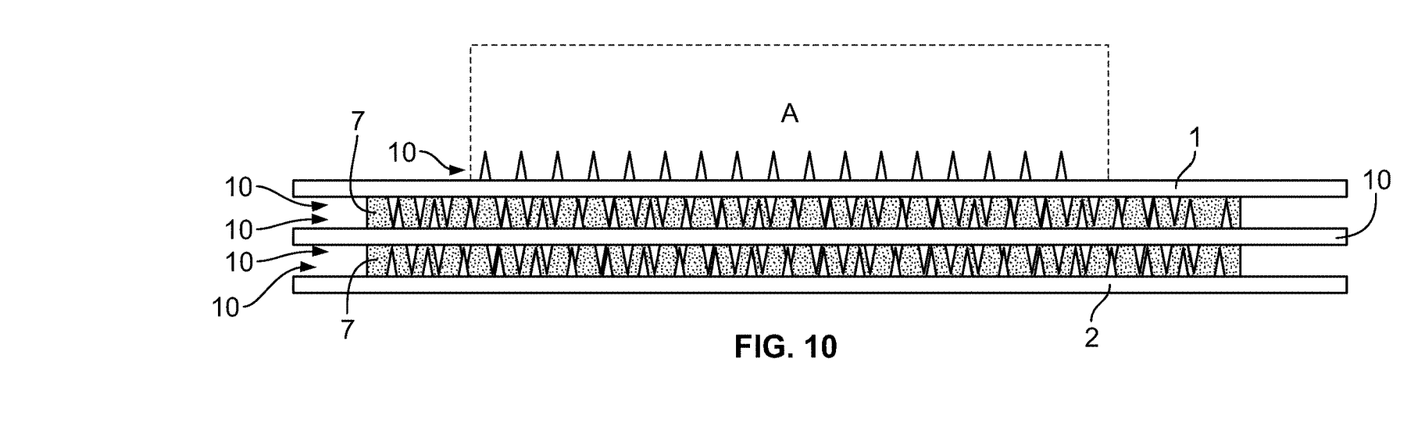
FIG. 10 is a side view of a third embodiment (similar to that shown in FIG. 8) having multiple stamping layers.

In one embodiment, as shown in FIG. 8, a dual-sided metal sheet may be used for at least one of the stampings (i.e. having piercing member texturing 10 over at least a portion of each surface). This allows for the formation of the composite backing plate, and also allows for an exposed textured surface on which friction material may be joined. As shown in FIG. 10, multiple sheets may be sandwiched together with core material. Other variations are possible.

The sandwich of material formed by the present method is able to provide an extremely stiff and rigid laminate because of the unique locking effect of the piercing members. The piercing members want to stay at a right angle to the lamina face. However, the tips of the piercing members (being embedded in the core material) are prevented from converging, and thus the entire sandwich of material cannot flex or bend. In this way, an exceptionally stiff laminate is created from what would otherwise be a relatively flexible sheet of metal (due to the relative thinness). Various types, qualities and grades of metals may be used (e.g. stainless steel, regular steel, aluminum), including cheaper or lower grade metals that might not ordinarily be considered for backing plate use.

The core material can be any non-compressible (preferably lightweight) material. Such materials may be selected to have specific properties beneficial for brake pad use (e.g. heat resistance (to limit heat transfer), weather-resistance, corrosion-resistance, etc.). Such materials need not be stiff or rigid on their own and may in fact be somewhat brittle. One presently preferred material is friction material which is already tested and has known performance under braking conditions. Friction material has the additional advantage of being lightweight for its size.

As a weight comparison, consider the following example of a backing plate:

|  | Overall thickness | Steel thickness | Core thickness (using friction material core) | Overall weight |
| --- | --- | --- | --- | --- |
| Standard steel backing plate | 0.650" (16.5 mm) | 0.260" (6.6 mm) | n/a | 0.656 pound (295 gram) |
| Composite backing plate | 0.650" (16.5 mm) | 0.040" (1 mm) and 0.040" (1 mm) | 0.181" (4.6 mm) | 0.400 pound (0.182 gram) |

The sandwich may be rolled or pressed to achieve full embedment of the piercing members in the core material. Application of heat or pressure may also be necessary in certain circumstances. Where a two-sided (i.e. 2 textured surfaces) stamping is used (e.g. FIG. 8, 9), the rolling or pressing may be done with very localized application to avoid breaking or crushing the piercing members that are exposed (e.g. the roller may follow tracks between rows of piercing members).

Figure 15:
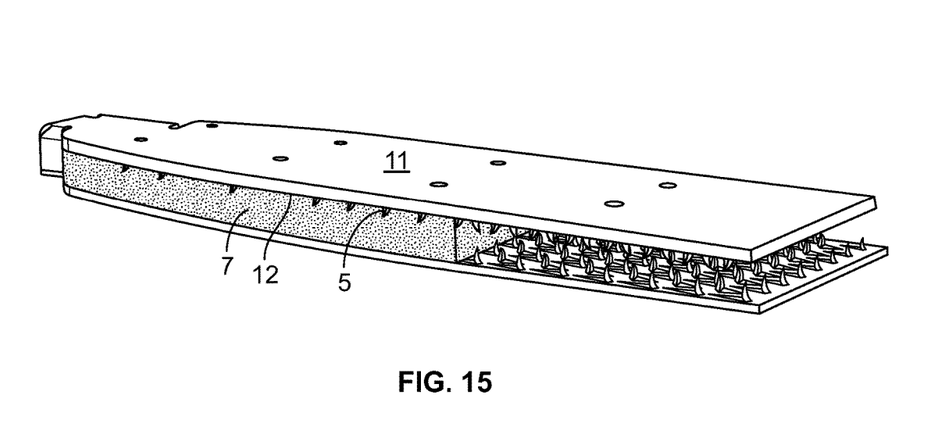
FIG. 15 is a side perspective view of an embodiment of assembly (friction material 20 and a portion of core material 7 removed to show detail).
Figure 16:
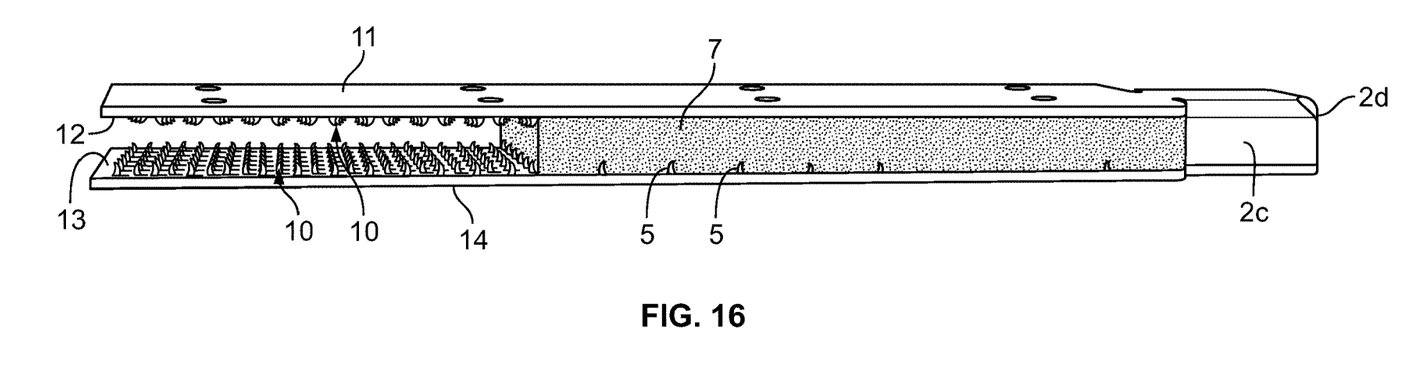
FIG. 16 is a side view of FIG. 15 showing abutment tabs.
Figure 17:
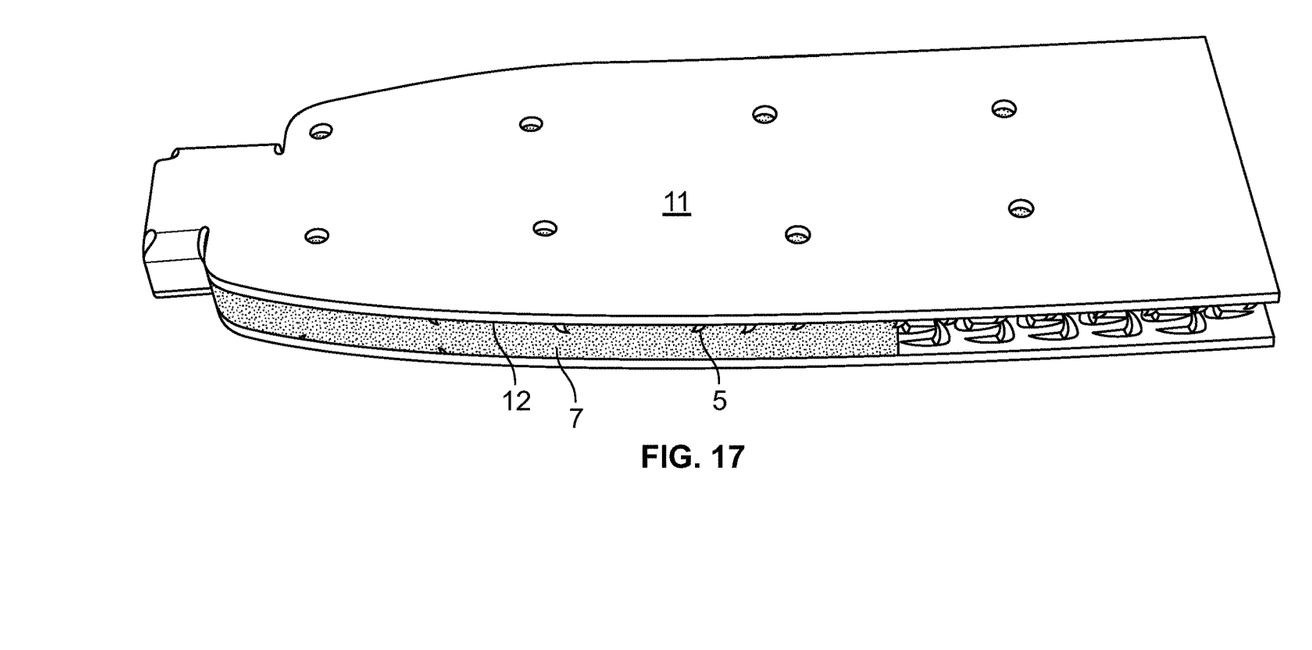
FIG. 17 is a top perspective view of FIG. 15.

The height of the piercing members and the thickness of the core material will govern the degree of embedment. In some cases, as shown in FIGS. 15-17, the piercing members may extend only partway into the core material. The shape of the piercing members as hooks may aid in this case to provide pull-apart resistance. The hook tips may also grip onto fibers, etc. in the core material (e.g. if fibrous material is used—such as certain formulations of friction material).

Clinching of the tips adds a further increase in pull-apart or peel resistance. As used herein, "clinch" (clinching, clinchable, clinched) describes the act of bending over the exposed tip of a pin- or nail that has pierced through two or more layers and extends therefrom. Clinching is a common practice in the wood construction trade. Clinching is analogous to riveting in metal work, or to any other deformation of a fastener to prevent its easy withdrawal. The purpose of clinching is to impart greater cohesion between the two laminate layers that are so joined. "Co-clinched" refers to the piercing members interengaging with each other and with the core material (from above and below) to form a fully criss-crossed web of pierced material. In the present case, piercing members may clinch by contact with opposing textured surfaces and may co-clinch by contact with other piercing members.

Figure 7:
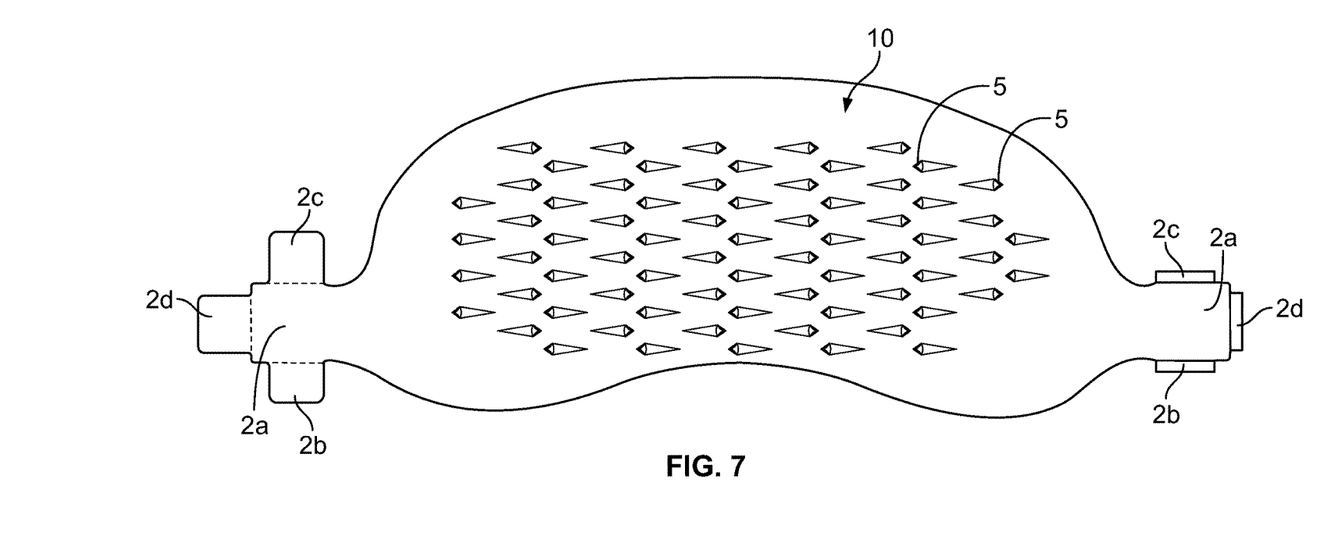
FIG. 7 is a top view of stamping 2 prior to assembly with core material 7.
Figure 9:
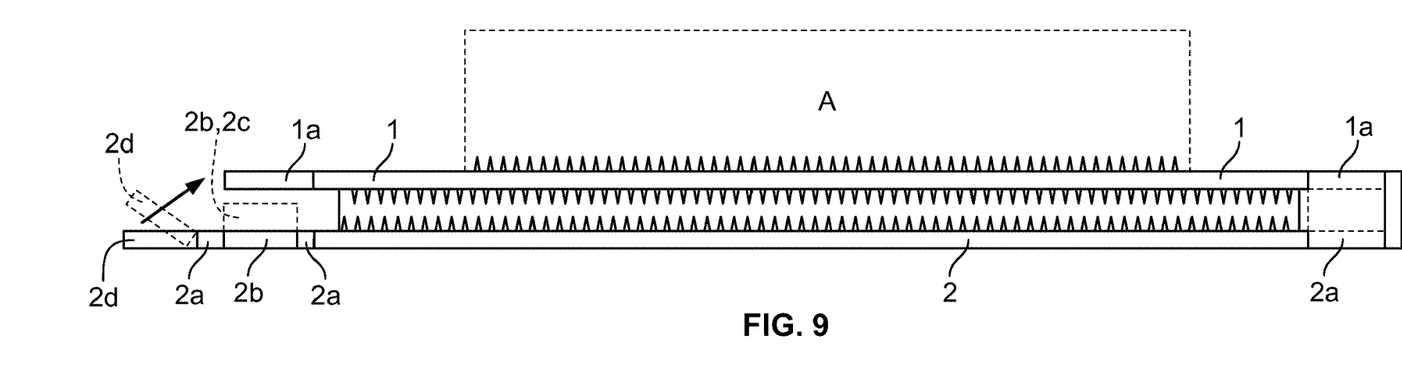
FIG. 9 is a side view of FIG. 8 shown in partial assembly wherein abutment tab bending process is illustrated.

FIGS. 7 and 9 show a further embodiment in which abutment end covers are formed as a secondary operation. The sandwich by itself leaves exposed stamped metal edges, which may lead to undesirable scraping or drag in the caliper bracket. To avoid this, a surface of enhanced smoothness and flatness can be provided by using tabs of the metal stamping to cover the core material at each abutment end. One embodiment is shown in FIG. 7, in which a blank of metal is provided with the general outline of the finished backing plate shape plus tab extensions 2b-2d at the abutment ends. These tabs can be bent down (or up) to cover the abutment end and its sides (as shown in FIG. 9), enclosing the core material 7 at these ends. The abutment ends can be submitted to further flattening, grinding, sanding or coating operations to ensure an even smoother, flatter surface. It will also be appreciated that other overhanging portions of the stampings (besides the abutment ends) may also be bent up or down to achieve various effects (including full encasement of all sides of the core material).

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. The scope of the claims should not be limited by the preferred embodiments set forth in the examples, but should be given the broadest purposive construction consistent with the description as a whole.

The invention claimed is:
1. A brake backing plate comprising:
 a) a first sheet metal workpiece;
 b) a second sheet metal workpiece;
 c) a core material sandwiched between the first sheet metal workpiece and the second sheet metal workpiece;
the first sheet metal workpiece and the second sheet metal workpiece each having a respective textured face with a plurality of piercing members, the piercing members of each respective textured face piercing the core material to secure the first sheet metal workpiece, the second sheet metal workpiece, and the core material together.

2. The brake backing plate of claim 1, wherein the core material is non-compressible.

3. The brake backing plate of claim 1, wherein the core material is a cured core material.

4. The brake backing plate of claim 1, wherein at least one of the first sheet metal workpiece and the second sheet metal workpiece is a steel stamping.

5. The brake backing plate of claim 1, wherein the piercing members have a hook shape.

6. The brake backing plate of claim 1, wherein at least some of the piercing members of the first sheet metal workpiece extend through the core material to contact the second sheet metal workpiece.

7. The brake backing plate of claim 1, wherein at least one of the first sheet metal workpiece and the second sheet metal workpiece is non-perforated.

8. The brake backing plate of claim 1, wherein the first sheet metal workpiece further comprises a second textured face opposed to the textured face for joining to a friction material.

9. The brake backing plate of claim 1, wherein each textured face further comprises a plurality of trenches, each respective trench associated with a respective one of the piercing members.

10. A method for assembling a brake backing plate, the method comprising:
a) joining a textured face of a first sheet metal workpiece to a core material, the textured face of the first sheet metal workpiece having a first plurality of piercing members that penetrate the core material; and
b) joining a textured face of a second sheet metal workpiece to the core material, the textured face of the second sheet metal workpiece having a second plurality of piercing members that penetrate the core material.

11. The method of claim 10, wherein step a) comprises positioning the core material adjacent the textured face of the first sheet metal workpiece, and applying pressure to pierce the core material with the first plurality of piercing members to secure the first sheet metal workpiece to the core material.

12. The method of claim 10, wherein step b) comprises positioning the core material adjacent the textured face of the second sheet metal workpiece, and applying pressure to pierce the core material with the second plurality of piercing members to secure the second sheet metal workpiece to the core material.

13. The method of claim 10, wherein steps a) and b) comprise curing the core material.

14. The method of claim 13, wherein curing the core material comprises applying heat to the core material.

15. The method of claim 10, further comprising clinching at least some of the first plurality of piercing members.

16. The method of claim 10, further comprising prior to step a), cutting the first sheet metal workpiece and the second sheet metal workpiece to a backing plate shape.

17. The method of claim 10, wherein steps a) and b) are carried out concurrently.

18. The method of claim 10, further comprising prior to step a), gouging the first sheet metal workpiece to form the first plurality of piercing members.

19. The method of claim 10, further comprising prior to step b), gouging the second sheet metal workpiece to form the second plurality of piercing members.

20. The method of claim 10, wherein the core material is a non-compressible material.

* * * * *